United States Patent [19]

Miller

[11] 4,154,620

[45] * May 15, 1979

[54] PIGMENT PREPARATION AND USE IN COATING COMPOSITIONS

[75] Inventor: Russell C. Miller, Chicago, Ill.

[73] Assignee: J. M. Eltzroth & Associates, Inc., Schaumburg, Ill.

[ * ] Notice: The portion of the term of this patent subsequent to Jan. 10, 1995, has been disclaimed.

[21] Appl. No.: 660,173

[22] Filed: Feb. 23, 1976

Related U.S. Application Data

[63] Continuation-in-part of Ser. No. 505,212, Sep. 12, 1974, abandoned.

[51] Int. Cl.$^2$ ............................ C09C 1/34; C09C 1/02
[52] U.S. Cl. .................................... 106/302; 106/306; 106/309; 106/14.21; 106/73.1; 423/341; 423/331
[58] Field of Search ...................... 106/306, 73.1, 302, 106/309, 292; 423/331, 341, 332

[56] References Cited

U.S. PATENT DOCUMENTS

| | | | |
|---|---|---|---|
| 666,980 | 1/1901 | Sellar | 423/341 |
| 789,671 | 5/1905 | Reich | 423/341 |
| 1,034,599 | 4/1911 | Ekstrom | 423/341 |

*Primary Examiner*—Patrick Garvin
*Assistant Examiner*—J. V. Howard
*Attorney, Agent, or Firm*—Richard L. Johnston

[57] ABSTRACT

A new and useful pigment is prepared by reacting an inorganic silicofluoride and an inorganic calcium compound selected from the group consisting of calcium oxide, calcium hydroxide and calcium carbonate. The product is especially useful in protective coating compositions which are applied to metals in order to enhance adherence to and corrosion resistance of metals such as aluminum, zinc, magnesium, steel and alloys of said metals.

9 Claims, No Drawings

PIGMENT-PREPARATION AND USE IN COATING COMPOSITIONS

This application is a continuation-in-part of U.S. Ser. No. 505,212 filed Sept. 12, 1974, now abandoned.

BACKGROUND

It is well known in the metal coating industry that there is a continuing need for coatings used for paint bonding and corrosion resistance. This is especially true where the metal is steel, aluminum, magnesium, aluminum alloys and zinc surfaced articles including galvanized iron or steel, where such coatings are required in order to protect the articles against deterioration.

In the past many such coatings have been suggested and used such as phosphate, zincate and anodized films but, in general, these coatings have left much to be desired because of various deficiencies including complex and often difficult operating procedures and high costs.

Chromate conversion coatings have been used with varying degrees of success. The effective protective ingredient in these coatings seems to be chromium in the hexavalent state. It has long been recognized that it would be desirable to coat metals with an organic film forming resinous composition which would not only be adherent to the metal but would also provide corrosion resistance. Unfortunately attempts to accomplish this result have not been very successful.

OBJECTS

One of the objects of the present invention is to provide a new and useful type of water insoluble pigment which is especially useful in the preparation of emulsions of organic resinous film forming binders and which when applied to metals such as aluminum, zinc, magnesium, steel and alloys of such metals and dried will form a coating on the metal which adheres to the metal and provides an unusual amount of corrosion resistance when the coated metal is subjected to salt spray tests.

Another object of the invention is to provide a new and improved process for preparing a water insoluble pigment of the type described.

Still another object of the invention is to provide new and improved coating compositions which can be applied to metals of the type described as a primer coating and which can thereafter be overcoated with a secondary coating or a top coating and particularly with water based paint emulsion coatings. Other objects will appear hereinafter.

BRIEF SUMMARY OF THE INVENTION

In accordance with the invention a pigment is prepared by mixing approximately equimolecular proportions of an inorganic silicofluoride and an inorganic calcium compound selected from the group consisting of calcium oxide, calcium hydroxide and calcium carbonate in water sufficient to form a thick slurry of calcium silicofluoride, and grinding the resultant slurry.

The process is preferably carried out at the temperature generated by the heat of reaction while maintaining a pH within the range of about 5.0 to about 10.5, preferably 7.0 to 7.5.

DETAILED DESCRIPTION OF THE INVENTION

The inorganic silicofluoride used in practicing the invention is preferably fluosilicic acid ($H_2SiF_6$) which is available commercially as a 26% aqueous solution. However, other inorganic silicofluorides can be employed as, for example, zinc silicofluoride, lead silicofluoride, manganese silicofluoride, sodium silicofluoride and potassium silicofluoride, magnesium silicofluoride, and others.

In carrying out the process, a mixed pigment can be prepared by adding at least one chromium compound selected from the group consisting of chromic acid, strontium chromate, zinc chromate and lead chromate to the slurry of said inorganic calcium compound and said inorganic silicofluoride, the quantity of said chromium compound being within the range of 0.05 to 50% by weight of the total solids.

Coating compositions are prepared by mixing the calcium silicofluoride pigment slurry in which the pigment particles are usually in very fine form, e.g., an average particle size of 0.5 to 10 microns, or a mixed pigment containing calcium silicofluoride and an inorganic chromium compound of the type previously described with emulsions of thermoplastic resins, thermosetting resins, or mixtures of thermoplastic resins and thermosetting resins in water where water is the continuous phase, preferably with the addition of at least one hexavalent inorganic chromium compound such as, for example, chromic acid or sodium dichromate, pigments and pigment extenders other than calcium silicofluoride, driers such as naphthenates of cobalt, lead, magnesium, manganese, zinc and/or zirconium, coalescing agents, dispersants, defoamers, surfactants and water soluble additives such as ammonium hydroxide, dimethylethanolamine and diethanolamine to enhance stability of the emulsion. Additional water is usually required over that normally present in commercial emulsions of resinous binders.

Preferred coating compositions coming within the scope of the invention consist essentially of the following:

| | Ingredients | Weight % |
|---|---|---|
| (a) | resin solids of at least one organic film forming resin selected from the group consisting of thermoplastic resins, thermosetting resins, and mixtures thereof | 10–60 |
| (b) | calcium silicofluoride | 0.5–20 |
| (c) | hexavalent inorganic chromium compound as Cr | 0–10 |
| (d) | pigments and pigment extenders other than (b) | 0–100 of resin |
| (e) | driers | up to 0.5 of total solids |
| (f) | coalescent agents | 0.05–10 |
| (g) | dispersants | 0.05–6 |
| (h) | defoamers | 0–0.05 |
| (i) | surfactants | 0.01–3 |
| (j) | thickening agents (viscosity and required film thickness-determinants) | trace to 10.0 by weight of resin |
| (k) | water including water soluble additives | 5–65 |

A preferred type of thermoplastic resin emulsion is one containing 100% acrylic emulsion polymer comprising 46±0.5% by weight solids having a pH of 9 to 11 and weighing approximately 8.9 pounds per gallon. Such an acrylic emulsion polymer is available commercially under the name Rhoplex MV-1, Ucar 4358.

A preferred thermosetting resin for use in the practice of the invention is an acrylic emulsion polymer containing 46±0.5% by weight solids having a pH of 9.5 to 10.5 and weighing approximately 9 pounds per gallon. Such a resin is available commercially under the name Rhoplex AC-604. Examples of other suitable resins are those sold under the names Rhoplex B-5 and Rhoplex AC-33X, Ucar 878,4550.

While the foregoing resins are preferred in the practice of the invention, the invention in its broadest aspects is not limited to these particular resins. The types of resins used are many, e.g., vinyl, polyester, epoxy and acrylic, either simple or modified, or mixed; cross linking additives such as, for example, melamine resins, methylated urea formaldehyde and synthetic type rubber type resins can be used.

Typical examples of resin combinations are thermoplastic (e.g., Rhoplex MV-1)-thermosetting (e.g., Rhoplex AC-604); thermoplastic (e.g., Rhoplex MV-1)-thermosetting (e.g., Rhoplex AC-604)-thermosetting (Epoxy PR-808); thermoplastic (e.g., Rhoplex MV-1)-thermosetting (e.g., Rhoplex B-5)-thermosetting (e.g., Rhoplex E-1046)-cross linking (e.g., Uformite M83, a melamine resin); and thermoplastic (e.g., Rhoplex MV-1)-thermosetting (e.g., Rhoplex B-5)-thermosetting (e.g., Rhoplex AC-33X and Rhoplex E-1046)-cross linking (e.g., HYCAR CTBN, Uformite M-83, and Beetle 65), Cymel 303.

The various resins are formulated into emulsions in a conventional manner by mixing them in water with various additives including dispersion agents, surfactants, defoamers, coalescing agents, coupling agents, flow control agents, pH control agents and viscosity control agents. The variety of these additives is quite large in number and while the end product produced will have somewhat different chemical and physical characteristics depending upon the particular additives, except to the extent herein described, the invention is not limited to particular additives. Examples of suitable coupling agents normally employed in making such emulsions are isopropyl alcohol, N-butyl alcohol, and tertiary butyl alcohol. Examples of suitable coalescing agents are butyl Cellosolve, butyl carbitol and tributyl phosphate. Hydrolyzable esters and water soluble substances detract from shelf life and water and vapor insensitivity.

The preferred pH control materials are ammonium hydroxide, dimethylethanolamine, and diethanolamine. These substances are alkaline as contrasted with the aqueous solutions of the dichromates which are acidic. Tertiary amines such as dimethylethanolamine are preferred from the standpoint of enhancing the stability of the resultant emulsions with which the hexavalent chromium compounds have been incorporated, Diethanolamine also gives good results. The use of ammonium hydroxide is also effective but with the stability somewhat less. However, the use of ammonium hydroxide has the advantage that it decomposes more easily after the emulsion coating composition has been applied to a substrate and during the curing process. For this reason it is usually desirable to add the hexavalent chromium as ammonium dichromate. It is also customary to use the pH control agents in the form of aqueous solutions, for example, ammonium hydroxide as a 28% aqueous solution and the amines diluted in equal weight proportions (i.e., 1:1) with water.

Examples of thickening agents are polyacrylic acid and salts thereof, for example, the sodium and ammonium salts such as Acrysol GS, Acrysol G-110 and Acrysol WS-24; cellulose (methyl, carboxy methyl, hydroxy methyl and ethyl cellulose-1,000 to 150,000 CPS); silicas; silicates.

Examples of pigment dispersants, stabilizers and surfactants are those materials sold commercially under the names Tamol 731, Tamol 850, Triton CF-10 which is a water soluble nonionic oxyethylated benzyl ether of octyl phenol, Triton X-114 which is an oxyethylated octyl phenol, and Ethoxylan E which is lanolin reacted with ethylene oxide.

As shown by the foregoing description of the preferred coating composition, the use of pigments and pigment extenders other than calcium silicofluoride is optional. Among the preferred optional pigments and extenders are lead silicate, chromate pigments (e.g., Oncor-M50 which has a yellow-brown color), potassium zinc chromate, magnesium silicofluoride, titanium dioxide, and strongium chromate. As pigment extenders hydrophilic and hydrophobic silicas, synthetic talc and silicates can be employed, with the hydrophilic silicas being preferred.

In preparing the calcium silicofluoride pigment, the reaction between the inorganic silicofluoride such as fluosilicic acid and the inorganic calcium compound is exothermic and the mixing container is preferably jacketed and water cooled. Usually the temperature should be above that giving ice crystal formation and not above 90° F., preferably around 70°-80° F. In order to control the pH chromic acid can be used to neutralize the slurry and thereby produce a chromium containing pigment. If it is desired to prepare the calcium silicofluoride pigment without chromium, another inorganic acid, e.g., phosphoric acid, can be used to control the pH.

It is usually desirable to adjust the viscosity of the final coating composition to a Zahn #1 viscosity of 10-35 seconds or a Zahn #2 viscosity of 15-50 seconds. This can be done by adjusting the water content and by the use of thixotropic agents or thickeners which are well known in the art.

A given emulsion coating composition might be modified depending upon the type of application, i.e., roll coating, spray coating, immersion and squeegee applications, electrostatic applications and other methods of application.

Where the emulsion coating composition contains both thermoplastic resins and thermosetting resins the weight ratio of thermoplastic resins to thermosetting resins is preferably within the range of 6:1 to 3:1, the ratio however, can be altered at will. The more thermosetting resin used the less the water and vapor sensitivity and extensibility.

If a cross linking agent is employed, the amount is preferably at least 25% by weight of the resin to be cross linked.

Where pigments are added the weight ratio of pigment to resinous binder is usually within the range of 5:95 to 40:60, although it can be as low as 1:99.

In the application of the coating compositions to a substrate such as a metal, those skilled in the art will recognize that cleaning and preparation of the metal is quite important and may involve the usual cleaning methods, deoxidizing of the substrate, rinsing and drying.

After the emulsion coating composition is applied to a substrate, e.g., steel, aluminum, magnesium, or a zinc surfaced substrate, it is dried or allowed to dry and cured, for example, at 400° F. for from 30 seconds to 3 minutes or 600° F. from 20 to 90 seconds, or 1–6 seconds using an intense infra-red air blown unit at 2000° F. The time of heating is longer at lower temperatures and shorter at the higher temperatures. The time-temperature relationship is preferably controlled to give a final coating having a pencil hardness of H to 2H.

The wet thickness of the applied coating is usually within the range of 0.05 mil to 10 mils (a mil equalling 0.001 inch). A preferred thickness of the wet coating is within the range of 0.1 to 0.3 mil. The greater the thickness of film the greater will be the difficulty of acquiring a uniformly "cured" film.

The quantity of the cured coating can be tested in a number of ways. One such test is the salt spray test where a mist or fog of an aqueous solution containing 5% sodium chloride or acetic acid acidified sodium chloride is applied to coated panels over a predetermined time period.

Another type of test is the Q-Panel Humidity Panel Test in which the coated panel is subjected to humidities of 90 to 100% at temperatures of from 100° F. to 190° F. with drying in cyclical periods, the cycles being timed at 0 to 60 minutes under high humidity conditions and 0 to 60 minutes under drying conditions or in variation in 10 minute units of time.

Another test which is perhaps the most strenuous of all involves boiling the coated panels in distilled water for 30 minutes, 60 minutes or 120 minutes. The area being tested may or may not be impacted of bent. Usually a pencil hardness test is made before and after the test (allowing 5 to 15 minutes recovery at room temperature). Observation can be made for resistance to solvation of coating, chalking of coating and water absorption. A good film or coating should be capable of returning to its original condition after this test.

Other tests can be conducted to determine resistance to over-bake cure using pencil hardness, impact tests and bend tests. Continuity of film can be determined by using the Preece or modified Preece tests with acidified copper sulfate solution.

As previously indicated the composition of the emulsion to be applied as a coating may vary somewhat depending upon the nature of the substrate. Thus, in applying the emulsion coating compositions to aluminum (this term also includes aluminum alloys) experience has shown that excellent results are obtained either with high or low hexavalent chromium contents and either at low pH's or high pH's, although the pH is preferably within the range from 5.8 to 10.5. On the other hand, when the emulsion coating compositions are applied to steel, the pH should be below 7.0. In the treatment of galvanized iron or steel (i.e., zinc surfaced articles), it is preferable to have the hexavalent chromium present in amounts such that a coating of the emulsion coating composition on the substrate contains not more than 10 micrograms per square inch of hexavalent chromium, as Cr, and the pH is preferably 6.8 to 8.0 for best results. If too much hexavalent and active chromium is present it reacts with the zinc forming zinc chromates which tend to form a powder and give poor adhesion where a finishing top coat is applied.

The application of the emulsion coating compositions to magnesium (which includes magnesium alloys) is similar to that for aluminum although magnesium is very sensitive to low pH values below 5.0.

The invention will be further illustrated but is not limited by the following example in which the quantities are given in parts by weight unless otherwise indicated.

EXAMPLE

A pigment was prepared by mixing together in water 1 pound of slaked lime $(CaOH)_2$, 1 liter of water and 15 ml of a surfactant (Triton CF-10) to form a paste. 26% fluosilicic acid was then slowly added with thorough mixing until a pH of 8.0 was obtained. The reaction was highly exothermic and the mixer was water cooled. Thereafter, chromic acid was added until the pH was 7.0. This gave a pigment containing hexavalent chromium. If the addition of chromium is not desired, another acid such as phosphoric is used to neutralize the composition to the desired pH of 7.0, immediately before using—this is a catalyst addition. The pH value can be altered.

In either case the resultant composition was then ground in a ball mill and about ½ pound of synthetic talc was used to reduce gloss.

One to two pounds of titanium dioxide were then added (duPont 966 $TiO_2$). A premix was prepared by mixing together 500 ml of tributyl phosphate, 100 ml of a defoaming agent (NOPCO NXZ), 1 gallon of propylene glycol and 75 grams of a pigment dispersant and stabilizer (Tamol 830) added to the foregoing composition. The resultant mixture was milled until no fish eyes, agglomerates or large particles appeared on a ground gauge and the particles had a size within the range of 0.5 to 5 microns.

1000 ml of thermoplastic acrylic emulsion polymer (Rhoplex MV-1) was then added and milled with the pigment until all of the pigment particles were uniformly coated.

In a slow paddle wheel mixer 5 gallons of the aforesaid thermoplastic acrylic emulsion polymer was mixed with 2 gallons of water and the pigmented mixture slowly added thereto. Thereafter a dilute solution of sodium dichromate containing 1% to 10% by weight hexavalent chromium, as Cr, was added dropwise to the peripheral portion of the rotating mixture until a pH of 7.6 to 7.8 had been obtained.

A diluted thickening agent was then added (Acrysol G-110) until a viscosity reading of 25/30 seconds was obtained using a Zahn No. 2 cup. 2 gallons of an acrylic thermosetting polymer (Rhoplex AC-604) were then added and the mixture was mixed slowly for at least 6 hours.

A coating of the foregoing emulsion was applied to both 3003 aluminum sheet and spangle hot dip galvanized sheet to a wet thickness of 0.2 mil using a draw bar. The coated hot dip galvanized sheet was preheated to 160° F. for 30 seconds and cured at 600° F. for 75 seconds. The coated aluminum sheet was preheated at 160° F. for 30 seconds and cured at 600° F. for 60 seconds. In each case the resultant coatings had a pencil hardness of 2H/H.

The hot dip galvanized coated sheet withstood the impact of 80 to 100"-pounds and the coated aluminum sheet withstood impact of 30"-pounds. The aluminum sheet after being bent withstood an edge impact of 60"-pounds. The impact value (lbs/sq.in.) is that just before metal or crystal fracture occurs, thus, this value must be a variable.

Salt spray tests on both sheets were conducted to failure. The coated hot dip galvanized sheet ran 400 to 600 hours and the coated aluminum sheet ran over 1000 hours. On embossed aluminum sheeting a coating of the foregoing emulsion applied as previously described gave very superior results on sharply rounded areas as tested by the modified Preece copper sulfate test.

Coated panels prepared as previously described will adhere to finishing coats including, for example, polyester (e.g., PPG-JJ-487 Duracron), acrylic (e.g., PPG 11W30, Duracron 100, duPont 876-5461, 876-559 and 876-5484), polyvinyl chloride (e.g., Sherwin-Williams G-77WC198), modified silicone (e.g., 64X423), modified polyester (e.g., Dexstar 5X100A), modified epoxy (e.g., Dexstar 9X165), and aqueous resin coatings (e.g., Armorcote 11 White).

Since all of the chromate-type primers have a decided color, whenever a top coating is to be white or pastel in color, there is produced a decided color detraction after the baking operation. To offset this effect rutile titanium dioxide is incorporated and sometimes the addition of a blue pigment dispersible in water (e.g., Hercules Imperial A-984, or X2925) to improve the final color effect for whites, blues and greens. For other shades some comparable color pigments akin to the desired color tone can be added. These tend to block out or hide the color effect of the active chromates contained in the prime coating.

As will be apparent from the foregoing description, the emulsion containing compositions prepared in accordance with the invention can contain a wide variety of ingredients in various proportions. In general, however, these compositions fall into two main categories depending upon whether the resinous binder is a thermoplastic resin or a combination of thermoplastic and thermosetting resins. Where the resinous binder is solely a thermoplastic resin, the composition of the emulsion is preferably as follows:

| | |
|---|---|
| Thermoplastic resin (e.g., Rhoplex MV-1) | 50–90% (Vol.) |
| Water | 45–0% (Vol.) |
| Dilute inorganic chromate solution (e.g., Na$_2$Cr$_2$O$_7$) | Enough to give a pH of 5.5–9.0 |
| Drier (e.g., cobalt naphthenate) | 0.05–0.5% of total solids (wt.) |
| Pigment (e.g., CaSiF$_6$, or chromate containing CaSiF$_6$ | 0.5–20% (wt.) |
| Coalescing agents (e.g., tributyl phosphate) | 0.5–3% of the resin (vol.) |
| Surfactant (Triton CF10) | Trace to 0.1% of resin (wt.) |
| Thickening Agent (Acrysol G-110)- (as film thickness requires) | Trace to 10.0% of resin (wt.) |
| Titanium dioxide | 0–5% (wt.) |
| Dispersing agent (e.g., Tamol 850) | 0–5.0% of pigment (wt.) |

In the case of a composition containing both thermoplastic and thermosetting resins a preferred composition contains:

| | |
|---|---|
| Thermoplastic resin (e.g., Rhoplex MV-1) | 15–60% (vol.) |
| Thermosetting resin (e.g., Rhoplex AC-604) | 10–60% (vol.) |
| Water | 10–4% (vol.) |
| Dilute chromate solution [Na$_2$Cr$_2$O$_7$/NH$_4$OH; CrO$_3$/NH$_4$OH; (NH$_4$)$_2$C$_2$O$_7$/NH$_4$OH - diluted:20 pts water/ 1 part solid] | Enough to give pH of 6.8–9.5 |
| Pigment (e.g., CaSiF$_6$ or chromate containing CaSiF$_6$) | 0.5–20% (wt.) |
| Drier (e.g., cobalt naphthenate) | 0.05–0.5% of total solids (wt.) |
| Coalescing agents (e.g., tributyl phosphate) | 0.5–3% of the resin (vol.) |
| Surfactant (Triton CF10) | Trace to 0.1% of resin (wt.) |
| Thickening agent (Acrysol G-110)- (as film thickness requires) | Trace to 10.0% of resin (wt.) |
| Titanium dioxide | 0–5% (wt.) |
| Dispersing agent (e.q., Tamol 850) | 0–5.0% of pigment (wt.) |

In these compositions ammonium hydroxide, dimethylethanolamine, or diethanolamine are added with or without the thickener to obtain a desired viscosity which is within the range of 20 to 45 seconds on a Zahn No. 1 cup and 17 to 35 seconds on a Zahn No. 2 cup. The method of application and desired dry-film thickness will determine the viscosity value, along with the equipment for curing such applied film.

Certain catalysts can be incorporated to: increase the speed of cure, and/or lower the "cure" temperature. Such materials are, for example, thiocyanates (provided iron is not present to cause discoloration), toluene sulfonic acid, and phosphoric acid. It is suggested that if such be used, this along with other additives such as water, for viscosity control, should be added just prior to mixing (at usage station).

Also, it is desirable to keep the organic film-coating mixture at a pH value of 8.0 to 8.5 and make the final adjustment along with the aforementioned additions. This affords a more accurate pH control for whatever the desired pH value may be. For best results a pH of at least 7 is desirable because at acidic pH's the composition may set up prematurely to a mass which cannot be applied as a coating.

In the foregoing description reference has been made to the use of calcium silicofluoride as an inorganic pigment for use in compositions forming a protective coating on metals such as aluminum, zinc, magnesium, steel and alloys of such metals, with or without the addition of hexavalent chromium. It has been noted that when such compositions are applied to aluminum, apparently oxide formation on the surface of the aluminum does not occur after a coating composition containing the calcium silicofluoride is dried at temperatures of at least 200° F. and usually within the range of 400° F. to 600° F. The resultant coating with or without the film forming organic resin will not wash off with water and provides a protective coating at a thickness of 0.05–10 mils, especially within the range of 0.1–0.3 mil which is unusually resistant to corrosion, as tested by conventional salt spray testing methods and is especially resistant to corrosion caused by humidity. It is believed that this is attributable in part at least to the calcium silicofluoride breaking down in situ thereby creating a condition which interferes with the electrical action that normally produces corrosion.

Where the protective coating composition containing the calcium silicofluoride is applied to zinc surfaced articles and steel, it is desirable to include in the composition 0.01–10 weight percent, as Cr, of a hexavalent inorganic chromium compound. Of course, the chromium compound can also be included in a composition of the same type that is applied to aluminum but the behavior of the composition as applied to aluminum is somewhat different from the behavior as applied to steel and zinc surfaced articles such as galvanized iron or steel.

As previously pointed out, it is desirable to apply the compositions containing calcium silicofluoride to a metal of the type described after the metal has been cleaned. In this connection, especially good results have been obtained where the cleaning composition is of the type described in U.S. Pat. No. 3,840,841 which contains boron compounds. This may be attributable to interaction between a boron containing coating and the calcium silicofluoride containing coating.

While calcium silicofluoride has been referred to herein as a pigment, it will be apparent from the foregoing description that it is not necessarily inert and could also be called an activator when employed in protective coating compositions for metals in accordance with the invention.

It will be apparent that other variations can be made without departing from the spirit and scope of the invention.

The invention is hereby claimed as follows:

1. A process of preparing a pigment which comprises mixing approximately equimolecular proportions of an inorganic silicofluoride and an inorganic calcium compound selected from the group consisting of calcium oxide, calcium hydroxide and calcium carbonate in water sufficient to form a thick slurry of calcium silicofluoride, and grinding the resultant slurry to an average particle size of 0.5 to 10 microns.

2. A process as claimed in claim 1 in which said mixing is carried out at the temperature generated by the heat of the reaction.

3. A process as claimed in claim 1 in which said mixing is carried out while maintaining a pH within the range of about 5.0 to about 10.5.

4. A process as claimed in claim 1 in which said mixing is carried out at a pH of approximately 7.0 to 7.5.

5. A process as claimed in claim 1 in which the inorganic silicofluoride is $H_2SiF_6$.

6. A process as claimed in claim 1 in which the inorganic silicofluoride is selected from the group consisting of zinc silicofluoride, lead silicofluoride, manganese silicofluoride, sodium silicofluoride and potassium silicofluoride, and magnesium silicofluoride.

7. A process as claimed in claim 1 in which a quantity of at least one chromium compound selected from the group consisting of chromic acid, strontium chromate, zinc chromate and lead chromate is added to said slurry, said quantity being 0.05% to 50% by weight of the total solids.

8. A process as claimed in claim 7 in which said chromium compound is chromic acid.

9. A process as claimed in claim 7 in which said chromium compound is strontium chromate.

* * * * *